United States Patent [19]

Figler et al.

[11] 4,246,231

[45] Jan. 20, 1981

[54] FLUIDIZED SOLIDS APPARATUS

[75] Inventors: Robert G. Figler, Crown Point; William G. Ellsworth, Brookfield; Richard J. Misiorowski, Oak Lawn, all of Ill.

[73] Assignee: Standard Oil Company (Indiana), Chicago, Ill.

[21] Appl. No.: 24,193

[22] Filed: Mar. 27, 1979

[51] Int. Cl.³ .................. B01J 8/24; F27B 15/02
[52] U.S. Cl. .......................... 422/147; 137/382
[58] Field of Search ............... 422/139, 145, 147; 137/382, 382.5; 222/182

[56] References Cited

U.S. PATENT DOCUMENTS

| 2,701,788 | 2/1955 | Schutte | 422/139 |
| 2,838,062 | 6/1958 | Held et al. | 137/382 |
| 2,838,063 | 6/1958 | Weits et al. | 422/139 |
| 2,838,065 | 6/1958 | Held et al. | 137/382 |
| 2,852,444 | 9/1958 | Spencer | 422/139 |
| 2,901,331 | 8/1959 | Held et al. | 422/145 |
| 4,074,691 | 2/1978 | Luckenbach | 137/382 |
| 4,099,927 | 7/1978 | McKinney | 422/145 |

Primary Examiner—Bradley R. Garris
Attorney, Agent, or Firm—Richard A. Kretchmer; William T. McClain; William H. Magidson

[57] ABSTRACT

An apparatus for effecting chemical reactions in the presence of fluidized solids comprising at least one centrifugal separator for removing entrained solids from effluent gas, a dip-leg depending from the separator for returning separated solids to the fluidized system, and a unidirectional valve at the lower end of the dip-leg which is protected from erosion damage by a conical shroud.

9 Claims, 3 Drawing Figures

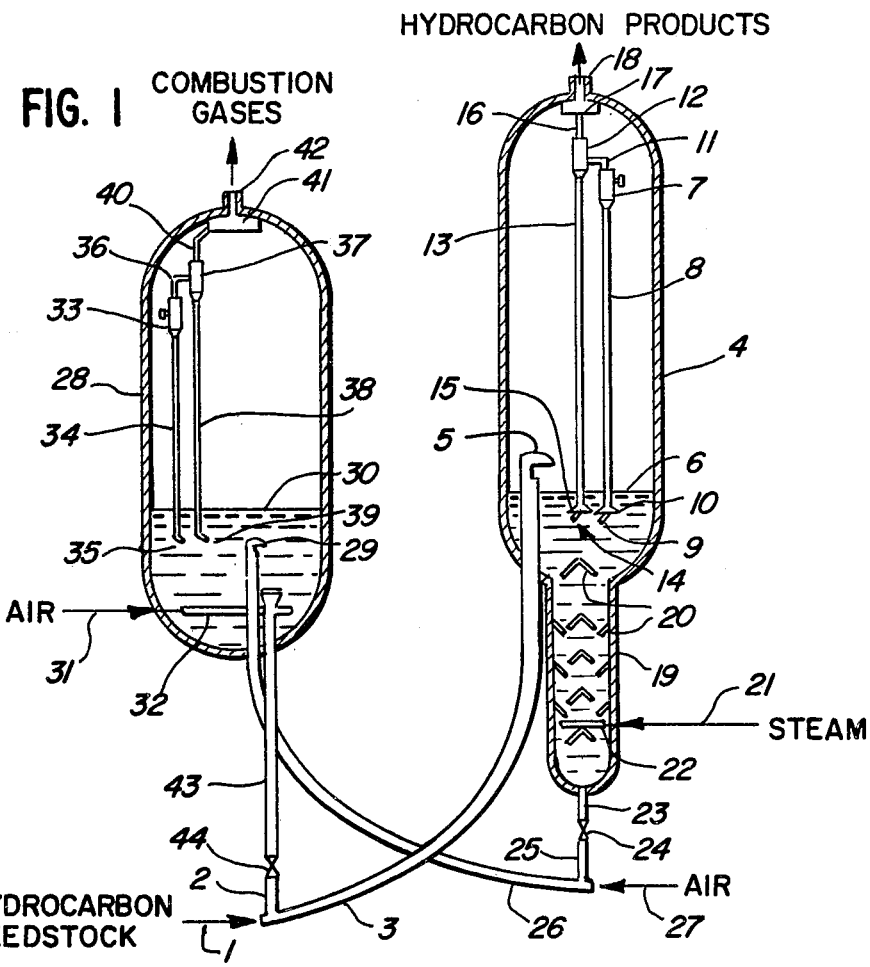
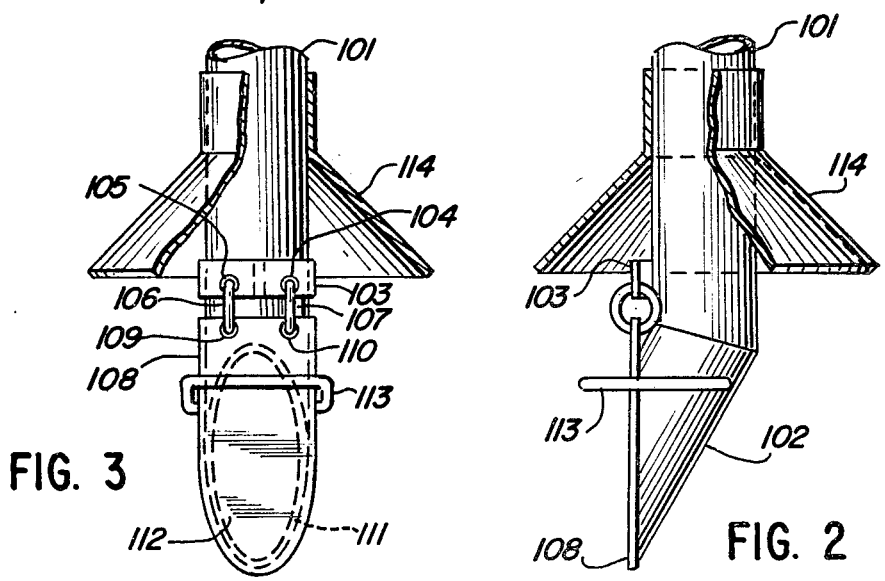

FLUIDIZED SOLIDS APPARATUS

BACKGROUND OF THE INVENTION

1. Field of the Invention

This invention relates to an apparatus for effecting chemical reactions in the presence of fluidized solids. The apparatus includes at least one centrifugal separator of the cyclone type for removing entrained solids from effluent gas and vapors, a conduit or dip-leg for returning separated solid particles from the cyclone to the fluidized system, and a unidirectional valve positioned at the lower end of the dip-leg. More particularly, the invention relates to an improved apparatus which reduces erosion damage to the unidirectional valve by the fluidized solids.

2. Description of the Prior Art

Systems wherein a chemical reaction is carried out in the presence of fluidized finely divided solid particles are well known and have found wide acceptance in a variety of fields. A particularly important application involves the conversion of various feedstocks by contact with fluidized finely divided catalyst particles as, for example, in the fluidized catalytic cracking of hydrocarbon feedstocks. Alternatively, the fluidized solid particles may themselves comprise a reactant as in the fluidized combustion of finely divided particles of coke or coal. In addition, the fluidized particles can be substantially inert and serve merely as a heat transfer medium and/or a substrate upon which reaction products may deposit.

A bed of fluidized solids is produced by the upward passage of a fluidizing gas through a bed of finely divided solid particles. The upward flow of gas through the solid particles exerts an upward or suspending force on the particles and serves to lift and agitate the particles. In a vessel containing a fluidized bed of solids, the lower portion of the vessel will contain a phase of high particle density having a fairly well defined upper surface. This lower dense phase behaves in many respects like a liquid. A dilute phase or disengaging space is located above the dense phase wherein the particle density is low and a separation of solid particles from the fluidizing gas is largely completed. Particle fluidization comprises a highly effective gas-solid contacting process. The particles are maintained in a suspended, turbulent state by the fluidizing gas and migrate more or less freely to all portions of the dense bed.

Ordinarily, it is desirable to separate effluent gases from solid particles as completely as possible prior to the discharge of these gases from a vessel which contains a fluidized bed. A substantial separation of gases and solids occurs within the vessel, but small amounts of solids are entrained by the fluidizing gases, are carried into the dilute phase, and are discharged together with the gases if additional separation means are not provided. Centrifugal separators of the cyclone type have been widely used to provide such additional separation.

A cyclone separator functions by allowing the particle laden gases to enter a cylindrical or conical chamber tangentially at one or more points, and the gases are discharged through a central opening. The solid particles are forced to the walls of the separator as a consequence of centrifugal acceleration and are led to a particle return conduit or dip-leg for return to the vessel. Frequently, the dip-leg extends into the lower dense phase but can also terminate in the upper dilute phase. If necessary, improved efficiency can be achieved by passing the particle laden gases through two or more cyclone separators which are joined in series.

A unidirectional valve is frequently positioned either within the dip-leg or at its lower end. This valve serves to permit the flow of separated solids from the cyclone while preventing a reverse flow of gases and solids into the cyclone from the dip-leg. A trickle valve is a widely used unidirectional valve comprising a pivotally mounted valve closure means at the end of the dip-leg which is exposed to the fluidized solids. This exposure to the fluidized solids subjects the valve to erosion as a consequence of mechanical action by the solid particles. After a period of time, this erosion damage may be severe enough to result in a complete failure of the valve. Such failure permits a significant flow of gases and solid particles up the cyclone dip-leg. This reverse flow of solids into the cyclone will, in turn, result in an increased discharge of particulate material with the effluent gases from the cyclone. If these effluent gases are discharged directly into the atmosphere, the additional particulate content is environmentally undesirable. If, instead, the effluent gases are discharged into associated process equipment for further treatment or separation, the increased particulate content is undesirable because of its erosive effect on the gas transfer lines and the need for removal of the solids during the subsequent processing steps. In addition, when the fluidized solid is a catalyst, the loss of such solid can be undesirable for the additional reason that such catalytic materials are frequently quite costly.

U.S. Pat. No. 2,838,063 has suggested that trickle valves be shielded from below. In addition, U.S. Pat. Nos. 2,838,062 and 2,901,331 teach the use of a perforated tubular shroud or housing which encloses the trickle valve on both top and bottom. The prior art does not, however, suggest the desirability of placing a conical shroud above the trickle valve to provide protection from the downward impingement of solid particles.

SUMMARY OF THE INVENTION

This invention is directed to an improved apparatus for carrying out a chemical reaction in the presence of fluidized solids comprising a vessel adapted to contain a dense phase of fluidized solid particles in its lower portion and a dilute phase in the upper portion, inlet means for introducing fluidizing gas into the lower portion of said vessel, outlet means for removing product vapors from the upper portions of said vessel, at least one centrifugal gas-solids separator in association with said outlet means and adapted to remove solid particles from said product vapors, a conduit in association with said separator for returning separated solid particles downward into said vessel, and a unidirectional valve means positioned at the end of said conduit which comprises a pivotally mounted valve closur means having said pivotal mounting attached to the exterior of said conduit. The improvement of the present invention comprises a conical body surrounding and attached to the lower end of the conduit with its base directed downward, wherein said conical body extends laterally at its base a distance from the conduit wall which is further than a vertical line passing through any portion of the pivotal mounting or valve closure means when in a closed position.

The conical body or shroud of this invention serves to protect the valve means from erosion by downward moving fluidized solid particles. Accordingly, it is an object of this invention to provide a pivotally mounted valve closure means which is resistant to erosion by fluidized solids. Other objects, aspects and advantages of the invention will be readily apparent from the following description and claims.

BRIEF DESCRIPTION OF THE DRAWINGS

FIG. 1 of the drawings is a schematic representation of a fluidized catalytic cracking process employing the improvement of the present invention.

FIG. 2 of the drawings is a detail of a trickle valve and the conical shroud of the present invention.

FIG. 3 of the drawings is another view of the trickle valve and the conical shroud of this invention shown in FIG. 2.

DETAILED DESCRIPTION OF THE INVENTION

It has been discovered that erosion damage to a trickle valve by fluidized solid particles can be primarily the result of impingement by particles which have a downward vector to their motion. According to the present invention, erosion damage to a trickle valve can be reduced by placing a conical shroud above the trickle valve. The conical shroud has its base directed downward and forms an angle with the wall of the dip-leg which is less than about 50°. Preferably, this angle is about 45°. The conical shape of the shroud serves to protect the trickle valve from erosion caused by particles which are moving downward at an angle as well as from particles which are moving vertically downward. In addition, it is believed that erosion of the shroud is minimized when the shroud forms an angle with the dip-leg of about 45°.

Desirably, the conical shroud of this invention is not perforated. With this preferred embodiment, surprisingly, a region of stagnant or poorly fluidized solids does not form under the nonperforated shroud and impair the operation of the trickle valve when immersed in a dense bed of fluidized particles. In addition, the collection of fluidizing gases under the nonperforated shroud does not hinder the operation of the trickle valve and, indeed, is believed to assist in preventing erosion damage to the trickle valve by upward moving solid particles. Although the mechanism of such assistance is unclear, it is believed that the shroud and trapped gases serve to create a region of turbulent fluidization below the shroud and around the trickle valve wherein solid particles having an upward motion are redirected laterally away from the trickle valve.

Although the conical shroud of this invention can have the shape of a general cone, it desirably has the shape of a circular cone and preferably of a right circular cone. When the shroud has the shape of a right circular cone, it is desirably coaxial with the dip-leg which it surrounds and to which it is attached.

The conical shroud of this invention extends laterally at its base a distance from the dip-leg wall which is further than a vertical line passing through any portion of the pivotal mounting or valve closure means when in a closed position. The largest cross sectional dimension or diameter of the shroud at its base is desirably from about 2 to about 5 times the largest cross sectional dimension or diameter of the dip-leg to which it is attached. In those embodiments wherein the dip-leg has a circular cross section and the shroud has the shape of a circular cone, the shroud has a diameter at its base which is from about 2 to about 5 times that of the dip-leg cross section.

The base of the conical shroud of this invention is located near the end of the dip-leg, and its base may be located either above or below the pivotally mounted valve closure means and its pivotal mounting or at intermediate positions. In that embodiment wherein the base of the shroud is below the valve closure means and its pivotal mounting, the trickle valve is completely protected from impingement by particles which have any downward vector to their motion. In a preferred embodiment, the base of the shroud is located above the pivotally mounted valve closure means by a distance which is less than about the largest cross sectional dimension or diameter of the shroud at its base. More preferably, this distance above the valve closure means is less than about one half of the largest cross sectional dimension or diameter of the shroud at its base.

The conical shroud of this invention is particularly useful for protecting trickle valves which are used in the reactor vessel of a system for the fluid catalytic cracking of hydrocarbons wherein a transfer line extends into the reactor vessel and discharges catalyst particles and cracked hydrocarbon products downwardly into said vessel from a position above the trickle valves. In such an embodiment, the shroud is desirably constructed of a heat resistant metal, for example carbon steel or stainless steel, and is desirably coated with refractory.

The invention can best be understood by reference to the preferred embodiment depicted in the attached drawings. It will be understood, however, that the invention is not limited to the embodiment shown, and that the invention includes alternatives, modifications and equivalents which are within the scope of the appended claims.

FIG. 1 of the attached drawings is illustrative of the use of this invention in the fluid catalytic cracking of hydrocarbons. A hydrocarbon feedstock from line 1 is contacted with hot regenerated catalyst from standpipe 2 in the inlet portion of transfer line 3. The resulting mixture of catalyst and hydrocarbon vapor passes upward through transfer line 3 and into reactor vessel 4. Transfer line 3 terminates in a downward directed discharge head 5. The upper surface 6 of the dense phase of catalyst particles is generally maintained below discharge head 5, thereby allowing cracked hydrocarbon products to disengage from the catalyst particles without substantial contact with the dense phase. However, if desired, the location of catalyst phase interface 6 may be varied from a position below discharge head 5 to a position above discharge head 5. In the latter case, increased conversion of the hydrocarbon feedstock will occur as a consequence of additional cracking taking place in the dense bed of catalyst in reactor vessel 4.

Vapors and entrained catalyst particles passing upward through reactor vessel 4 enter primary cyclone separator 7. Most of the entrained catalyst particles are separated in the first stage cyclone 7 and are discharged downwardly through dip-leg 8, through trickle valve 9, and into the dense phase bed. Conical shroud 10 is attached to dip-leg 8 near its lower end and above trickle valve 9. Gases and remaining catalyst particles are passed through interstage cyclone line 11 to second stage cyclone separator 12 where substantially all of the remaining catalyst is separated and passed downwardly through dip-leg 13, through trickle valve 14, and into the dense phase bed. Conical shroud 15 is attached to dip-leg 13 near its lower end and above trickle valve 14.

Conical shrouds 10 and 15 serve to protect trickle valves 9 and 14 from the erosive effect of fluidized catalyst particles and, in particular, those which are downwardly directed by distributor head 5. If desired, the location of catalyst phase interface 6 may be varied from above trickle valves 9 and 14 to a position below trickle valves 9 and 14. The surface of conical shrouds 10 and 15 is desirably covered by a refractory coating so as to protect the shrouds from erosion by catalyst particles.

Effluent vapors pass from cyclone 12, through line 16, into plenum chamber 17, and are discharged from the reactor vessel 4 through line 18. Vapor line 18 conveys the hydrocarbon vapors to a fractionation zone, not shown, wherein the vapors are separated into product fractions by methods well known in the art.

Catalyst particles from the dense phase in the lower portion of the reactor vessel 4 pass downwardly into stripping zone 19. Baffles 20 are situated in stripping zone 19, and steam from line 21 is discharged through steam ring 22 into the lower portion of stripping zone 19. Steam rising through the stripping zone 19 removes volatile hydrocarbons from the catalyst particles and serves to fluidize the catalyst in the stripping zone 19 and in the dense phase of reactor vessel 4.

Stripped spent catalyst is withdrawn from the bottom of stripping zone 19 through spent catalyst standpipe 23 at a rate controlled by valve 24, and discharges through standpipe 25 into spent catalyst transfer line 26. Spent catalyst from standpipe 25 is fluidized with air from line 27 and passes upwardly through transfer line 26 and into regenerator vessel 28. Transfer line 26 terminates in a downwardly directed discharge head 29, and effluent from transfer line 26 is discharged below the surface 30 of the dense phase of fluidized catalyst particles in regenerator vessel 28. Catalyst within the regenerator vessel 28 is fluidized by the flow of combustion air through line 31 to air ring 32, whereupon coke on the spent catalyst is burned and the catalytic activity of the spent catalyst is restored. Combustion gases continuously pass upwardly from the dense phase and into the dilute phase above the catalyst phase interface 30. These combustion gases together with entrained catalyst enter primary cyclone separator 33. Most of the entrained catalyst particles are separated in the first stage cyclone 33 and are discharged downwardly through dip-leg 34, through trickle valve 35, and into the dense phase. Combustion gases and remaining catalyst particles are passed through interstage cyclone line 36 to second stage cyclone separator 37 where substantially all of the remaining catalyst is separated and passed downwardly through dip-leg 38, through trickle valve 39, and into the dense phase. If desired, trickle valves 35 and 39 can be protected from erosion damage with a conical shroud in the same manner as trickle valves 9 and 14. Effluent gases from cyclone separator 37 pass through line 40, into plenum 41, and are discharged from regenerator vessel 28 through line 42. Effluent combustion gases from line 42 can be discharged directly to the atmosphere or, alternatively, can be passed through conventional heat exchange means prior to such discharge into the atmosphere.

Regenerated catalyst is withdrawn from the bottom of regenerator vessel 28 through line 43 at a rate controlled by valve 44 to supply hot regenerated catalyst to standpipe 2 as described above.

FIGS. 2 and 3 of the attached drawings illustrate a preferred embodiment of the invention. Solid particles separated by a cyclone separator are conveyed downward from the cyclone through dip-leg 101. At the end of dip-leg 101, these solid particles encounter a trickle valve. The trickle valve comprises conduit 102 which is attached to the lower end of dip-leg 101 and at an angle to the dip-leg 101. The T-shaped bracket 103 is attached to the outer surface of dip-leg 101, and the head of said T-shaped bracket 103 is a flat bar which is spaced somewhat from the dig-leg. The head of said T-shaped bracket 103 contains two circular openings 104 and 105 through which circular hinges 106 and 107 are inserted. Circular hinges 106 and 107 are constructed of rod having a diameter appreciably smaller than the diameter of openings 104 and 105 so that the hinges 106 and 107 can move freely through the openings 104 and 105. A flat valve plate 108 is supported by hinges 106 and 107, with the circular hinges passing through respective circular openings 109 and 110. Circular hinges 106 and 107 are constructed of rod having a diameter appreciably smaller than the diameter of openings 109 and 110 so that the hinges 106 and 107 may move freely through the openings 109 and 110. Valve plate 108 seats against valve seat 111 which comprises the edge surface of discharge opening 112. The pivotal mounting of valve plate 108 by hinges 106 and 107 permits facile valve operation. The plane of valve seat 111 is oriented at a slight angle from vertical so that valve plate 108 is normally in a closed position as a consequence of the action of gravity. Valve plate 108 will remain closed until the amount of solids accumulated in dip-leg 101 exerts a sufficient downward force to rotate valve plate 108 from a closed position and permit the discharge of these solids through discharge opening 112. Stop 113 serves as a control to limit the extent by which valve plate 108 can rotate open on hinges 106 and 107. Conical body or shroud 114 surrounds and is attached to dip-leg 101 near the lower end of said dip-leg 101 with its base above valve plate 108.

We claim:

1. In an apparatus for carrying out a chemical reaction in the presence of fluidized solids comprising a vessel adapted to contain a dense phase of fluidized solid particles in its lower portion and a dilute phase in the upper portion, inlet means for introducing fluidizing gas into the lower portion of said vessel, outlet means for removing product vapors from the upper portions of said vessel, at least one centrifugal gas-solids separator in association with said outlet means and adapted to remove solid particles from said product vapors, a conduit in association with said separator for returning separated solid particles downward into said vessel, and a unidirectional valve means positioned at the end of said conduit which comprises a pivotally mounted valve closure means having a pivotal mounting attached to the exterior of said conduit, the improvement which comprises a conical body surrounding and attached to the lower end of said conduit with its base directed downward, wherein said conical body extends laterally at its base a distance from the wall of said conduit which is further than the lateral distance between a vertical line passing through any portion of the valve closure means when in a closed position and the wall of said conduit, and wherein the base of said conical body is situated above the top of said valve closure means by a distance which is less than about the diameter of said base.

2. In an apparatus for the fluidized catalytic cracking of hydrocarbons comprising a reactor vessel defining a dense phase of fluidized cracking catalyst particles in its lower portion and a dilute phase in its upper portion for disengaging hydrocarbon vapors and fluidizing gas from spent cracking catalyst, inlet means for introducing fluidizing gas into the lower portion of said dense phase, outlet means for removing hydrocarbon vapors and fluidizing gas from the upper portions of said vessel, at least one centrifugal gas-solids separator in association with said outlet means and adapted to remove entrained catalyst particles from said hydrocarbon vapors and fluidizing gas, a conduit in association with said separator for returning separated catalyst particles downward into said vessel, a unidirectional valve means positioned at the end of said conduit which comprises a pivotally mounted valve closure means having a pivotal mounting attached to the exterior of said conduit, and a transfer line extending into said vessel for discharging catalyst particles and hydrocarbon vapors downwardly into said vessel from above the unidirectional valve means, the improvement which comprises a conical body surrounding and attached to the lower end of said conduit with its base directed downward, wherein said conical body extends laterally at its base a distance from the wall of said conduit which is further than the lateral distance between a vertical line passing through any portion of the valve closure means when in a closed position and the wall of said conduit, and wherein the base of said conical body is situated above the top of said valve closure means by a distance which is less than about the diameter of said base.

3. The apparatus as set forth in claim 2 wherein said conical body has the shape of a right circular cone.

4. The apparatus as set forth in claim 3 wherein said conduit has a circular cross section and said conical body has a diameter at its base which is from about 2 to about 5 times that of the conduit.

5. The apparatus as set forth in claim 4 wherein said conical body is coaxial with said conduit.

6. The apparatus as set forth in claim 5 wherein the angle formed by the wall of said conduit and said conical body is less than about 50°.

7. The apparatus as set forth in claim 5 wherein the angle formed by the wall of said conduit and said conical body is about 45°.

8. The apparatus as set forth in claim 6 wherein the base of said conical body is situated above the top of said valve closure means by a distance which is less than about one half of the diameter of said base.

9. The apparatus as set forth in claim 6 wherein said conical body is nonperforated.

* * * * *